No. 798,724. PATENTED SEPT. 5, 1905.
J. J. CORCORAN, DEC'D.
M. P. CORCORAN, ADMINISTRATOR.
COMBINED BEER HEATER, CONDENSER, AND CONTINUOUS DOUBLER.
APPLICATION FILED APR. 28, 1905.
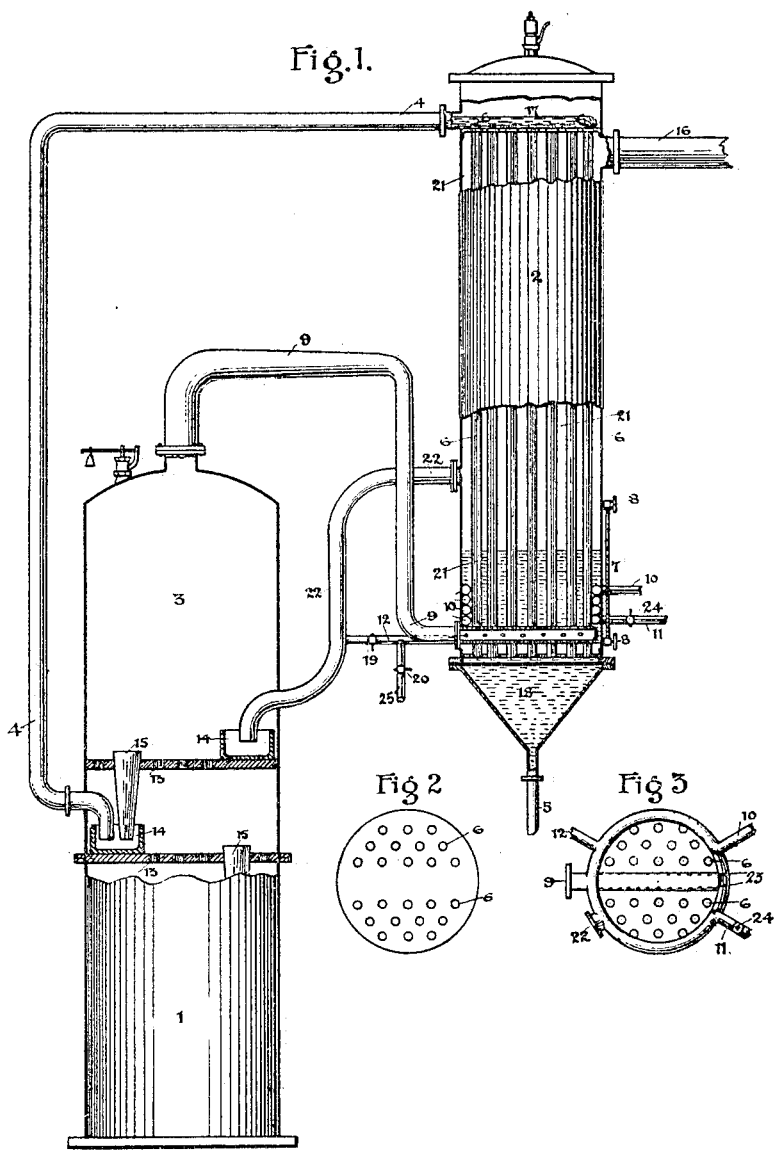

ered and the vapor therefrom condensed in
UNITED STATES PATENT OFFICE.

MARTIN PATRICK CORCORAN, OF LOUISVILLE, KENTUCKY, ADMINISTRATOR OF JOHN J. CORCORAN, DECEASED.

COMBINED BEER HEATER, CONDENSER, AND CONTINUOUS DOUBLER.

No. 798,724.	Specification of Letters Patent.	Patented Sept. 5, 1905.

Application filed April 28, 1905. Serial No. 257,946.

*To all whom it may concern:*

Be it known that JOHN J. CORCORAN, late a citizen of the United States and resident of Louisville, in the county of Jefferson and State of Kentucky, did invent a new and useful Combined Beer Heater, Condenser, and Continuous Doubler, of which the following is a specification.

The invention relates to improvements in apparatus for distilling whisky, and is an improvement on apparatus for the same purpose for which Letters Patent of the United States No. 764,711 were obtained.

The objects of the improvement are, first, to accomplish with a beer-heater and one worm the same results as heretofore with a beer-heater, two worms, and a doubler; second, saving in first cost of plant; third, saving of fuel; fourth, saving of labor; fifth, saving of water; sixth, economy of time in the process; seventh, improvement of flavor of the product, and, eighth, the doing away with much accessory machinery and apparatus necessary in the old way. These objects are attained by means of the mechanism illustrated in the accompanying drawings, in which—

Figure 1 is an elevation of the combined beer heater, condenser, and continuous doubler connected with a still with portions cut away to show the internal parts; Fig. 2, a plan view of the upper diaphragm, and Fig. 3 a plan view with the upper diaphragm removed.

Similar reference-numerals refer to similar parts throughout the several views of the drawings.

The still 1 is of the usual type now used in the art and does not form a part of the improvement.

The tank 2 constitutes the body of the improved apparatus.

3 is the vapor-chamber in the upper part of still 1.

4 is the beer-pipe for carrying the beer from 2 to the still.

5 is the beer-pipe for conducting the cold beer from the beer-pump to 2.

6 represents tubes which conduct the beer up through 2 and in which it is heated.

7 is a glass gage for showing the quantity of low-wines in 2.

8 represents the gage-cocks of gage 7.

9 is the vapor-pipe which conducts the vapor from chamber 3 to the lower part of 2.

10 is a heating-coil immediately above the delivery end of pipe 9.

11 is the supply-pipe for coil 10.

12 is a drain-pipe for draining the low-wines and impurities from the bottom of 2 into pipe 22 and by this means into the still.

13 represents the perforated heads in the still 1.

14 represents the trap-cups in the still into which the beer flows in its descent.

15 represents the overflow or "down" tubes, leading from one head 13 to the next below.

16 is the whisky-vapor pipe which conducts the whisky-vapor from the upper part of 2 to the worm or condenser.

17 is the chamber in the upper part of 2, into which the heated beer flows from tubes 6 and out of which it flows through pipe 4 to the still.

18 is the beer-chamber at the bottom of 2, from which the cold beer is distributed to pipes 6.

19 is a stop-cock in drain-pipe 12.

20 is a stop-cock in drain-pipe 25.

21 is the condensing and doubling chamber in 2.

22 is the overflow-pipe for carrying back any surplus of low-wines from 2 into still 1.

23 represents perforations in the end of pipe 9 in the bottom of chamber 21.

24 is a stop-cock in pipe 11.

25 is a branch drain-pipe from 12.

It is known to those skilled in the art to which the invention pertains that in the present practice the vapor from the still is conducted to the top of a beer-heater, and is caused to circulate about the beer-pipes and pass downward, the low-wines are condensed out and sink to the bottom of the beer-heater, whence they are drawn off into a separate doubler, the whisky-vapor passes out of the beer-heater near the bottom to the worm, and the low-wines are boiled in the separate doubler and the vapor therefrom condensed in another worm. Thus there are required the still, the beer-heater, two worms, and a doubler. On the other hand, with the improvement the vapor-pipe 9 from the still enters a tank 2, which comprises in one tank a beer-heater, a condenser, and a continuous doubler at the bottom of chamber 21, and the vapor of whisky is conducted from the top of chamber 21 by pipe 16 to the worm, whence it is drawn as whisky. The pipe 22 enters chamber 21 at a suitable height to produce whisky of the proof required, as explained hereinafter, enters chamber 3 of the still, and is sealed in the upper cup 14 to prevent the whisky-vapor from returning into the still or the vapor from the still taking a short course into chamber 21 without passing through the low-wines in the lower part of said chamber. This pipe 22 is for the purpose of allowing the low-wines which accumulate in chamber 21 and are too low to vaporize and form whisky to overflow back into the still and not blow out through pipe 16 to the worm. The beer is supplied to chamber 18 and thence distributed to pipes 6 at a temperature of 76° Fahrenheit, and the part 2 is constructed of such size and condensing capacity relatively to the steam-pressure used in the still and the capacity of the still that with pipe 22 at the proper height the beer supplied in proper amount to feed the still also cools the vapor in chamber 21 as required, so that the beer is fed neither insufficiently nor in excess. The low-wines and impurities may be drained from chamber 21 through pipe 12 by opening cock 19, and when it is desired to draw off low-wines this may be done by means of branch pipe 25 by closing cock 19 and opening cock 20. The end of pipe 9 which enters the lower part of chamber 21 enters just above the lower diaphragm and has perforations 23 of such number and of such minitude that the vapor from the still is choked or throttled and enters chamber 21 under pressure, and therefore hot, in order to boil the condensed low-wines collected there. Pipe 16 for conducting the whisky-vapor from 2 to the worm has its opening just under the upper diaphragm. Under some circumstances—such as cold weather, for instance—it is necessary to apply more heat to boil the low-wines in chamber 21. For this purpose a coil of pipe 10 is added within chamber 21, through which live steam may be caused to circulate, the amount being regulated by means of cock 24.

The mode of operation with the improved apparatus is as follows: The beer from the fermenters is pumped through pipe 5 into chamber 18, thence up through pipes 6 into chamber 17, and thence through pipe 4 into still 1. Here it is boiled, and the vapor passes into chamber 3, thence through pipe 9 into the bottom of chamber 21. In chamber 21 it is partly condensed, the low-wines being condensed here by the cold beer passing through pipes 6, and at the same time it heats the beer. The condensed low-wines and the whisky that has been condensed therewith are boiled by the hot vapor which issues from perforations 23 and, when necessary, assisted by the heated coil 10, and the whisky-vapor rises and passes out through pipe 16 to a worm or other condenser, whence it issues as whisky. The low-wines accumulate in chamber 21 till they reach the sealed overflow-pipe 22, through which the surplus continually drains back into the still and is expelled with the tailings, by which means the doubler feature of the improvement is rendered automatic and continuous. It will be understood that the more of the liquid low-wines in chamber 21 the vapor from the still must pass through the more it will be condensed, and consequently the higher will be the proof of the whisky-vapor that escapes through pipe 16 to the worm or condenser. The quantity of low-wines in chamber 21 is determined by the height of pipe 22, and therefore if whisky of high proof is required the opening for pipe 22 is made high, and vice versa. Thus it is seen that the improvement dispenses with one worm and the doubler and much other accessory apparatus and saves the steam necessary to reboil the low-wines in the doubler, the water necessary for the extra worm, and the space necessary to accommodate the extra worm, doubler, and accessory apparatus.

The whisky produced with the improvement has a superior flavor, because less exposed to the atmosphere than heretofore, and the yield is greater, because no whisky is lost in the doubler, the excess low-wines being reboiled in the still, except when drawn for special use.

It is known that the still and a tubular beer-heater of somewhat similar form as the one here shown are old, and these are not claimed broadly, nor is it desired to be confined to the particular construction shown; but

What is claimed as the invention, and desired to be secured by Letters Patent, is—

1. In apparatus for distilling whisky, in combination with a still of the usual form, an upright tank closed at both ends, a diaphragm extending across said tank at a short distance above its lower head and forming with said lower head a relatively small chamber in the lower end of said tank, a diaphragm across said tank at a short distance below its upper head and forming with said upper head a relatively small chamber in the upper end of said tank, and said two diaphragms forming in the middle of said tank a relatively large chamber, an ingress-pipe entering the lower chamber of said tank, an egress-pipe entering the upper chamber of said tank, an ingress-pipe entering the middle chamber of said tank immediately above the lower diaphragm, an egress-pipe entering the middle chamber of said tank above the last-mentioned ingress-pipe, an egress-pipe entering said middle chamber of said tank immediately below the upper diaphragm, a heating-coil disposed in the lower part of said middle chamber of said tank, and tubes extending through said middle chamber of said tank having their ends hermetically sealed in said diaphragms and forming a communication between said upper and lower chambers, substantially as specified.

2. In distilling apparatus, the combination of a still, an adjacent upright closed tank divided by diaphragms into an upper chamber, a middle chamber and a lower chamber, pipes passing through the middle chamber and forming means of communication between said upper and lower chambers, an ingress-pipe from the cold-beer supply entering said lower chamber, an egress-pipe entering said upper chamber and communicating with the still, a perforated ingress-pipe entering said middle chamber immediately above the lower diaphragm and communicating with the still, an overflow-pipe at a height above the last-named ingress-pipe predetermined according to the proof of the spirits required and communicating with the still, an egress-pipe entering the middle chamber of said tank immediately below said upper diaphragm and communicating with the worm or condenser, a heating-coil disposed in the lower part of said middle chamber, a drain-pipe from the bottom of said middle chamber and communicating with said overflow-pipe, and a branch drain-pipe from said drain-pipe, substantially as specified.

MARTIN PATRICK CORCORAN,
*Administrator of John J. Corcoran, deceased.*

Witnesses:
　A. KNOBEL,
　STELLA C. NORRIS.